United States Patent
Okamoto (10) Patent No.: US 6,646,251 B1
(45) Date of Patent: Nov. 11, 2003

(54) SEPARATE TYPE PHOTOELECTRIC SWITCH

(75) Inventor: Yasuhiro Okamoto, Osaka (JP)

(73) Assignee: Keyence Corporation, Osaka (JP)

( * ) Notice: Subject to any disclaimer, the term of this patent is extended or adjusted under 35 U.S.C. 154(b) by 69 days.

(21) Appl. No.: 09/617,861

(22) Filed: Jul. 17, 2000

(30) Foreign Application Priority Data

Mar. 22, 2000 (JP) ........................................ 2000-080217

(51) Int. Cl.⁷ .................................................. G06M 7/00
(52) U.S. Cl. ...................... 250/221; 250/22.1; 250/239; 345/46; 345/51; 345/52; 345/156; 235/462.2; 235/462.24; 235/462.25; 340/691.6
(58) Field of Search ............................. 345/46, 52, 51, 345/156; 250/221, 239, 22.1; 340/691.6; 235/462.24, 462.25, 462.2

(56) References Cited

U.S. PATENT DOCUMENTS

| | | | |
|---|---|---|---|
| 4,566,071 A | * | 1/1986 | Takahashi .................... 364/468 |
| 4,990,768 A | * | 2/1991 | Ito et al. ....................... 250/239 |
| 5,115,125 A | * | 5/1992 | Biggs ......................... 250/222.1 |
| 5,604,386 A | * | 2/1997 | Nagai et al. .................. 307/118 |
| 5,850,290 A | * | 12/1998 | Horiguchi et al. ........... 356/376 |

FOREIGN PATENT DOCUMENTS

| | | | |
|---|---|---|---|
| JP | 5-102823 | 4/1993 | .......... H03K/17/78 |
| JP | 6-310785 | 11/1994 | .......... H01S/3/096 |

* cited by examiner

Primary Examiner—Richard Hjerpe
Assistant Examiner—Abbas Abdulselam
(74) Attorney, Agent, or Firm—Kilyk & Bowersox, P.L.L.C.

(57) ABSTRACT

A tolerance-level display portion 12 is provided in a casing 11 of a head 1 of a photoelectric switch. A light reception signal output from the head 1 is transmitted through a cable 31b of a main body 2. The casing 21 of the main body 2 contains a received light amount display portion 22, a tolerance-level display portion 24, adjust switches 28 and setting switches 29. The CPU in the main body 2 calculates a ratio of a light reception signal to a threshold value to obtain a tolerance level, and applies a control signal corresponding to the obtained tolerance level to a variable power supply circuit. The variable power supply circuit applies a variable voltage, which is dependent on the control signal, through a cable 31a to the head 1. The tolerance-level display portion 12 of the head 1 displays a tolerance level on the basis of the variable voltage by turning on the tolerance-level display LEDs 12a, 12b and 12c.

39 Claims, 10 Drawing Sheets

SEPARATE TYPE PHOTOELECTRIC SWITCH

BACKGROUND OF THE INVENTION

1. Field of the Invention

The present invention relates to a photoelectric switch of the separate type, which is formed with a head and a main body, for detecting an object in a predetermined detection area.

2. Description of the Related Art

Photoelectric switches have been used for detecting objects in production lines of factory. The photoelectric switch projects light to within a predetermined detection area, receives light returned from an object, and determines whether or not an object to be detected is present within the detection area by receiving light returned from the object.

In the photoelectric switch of the transmission type, when an object to be detected does not exist within a detection area, light projected from a light projecting section enters a light receiving section. In this case, when a level of the amount of received light in the light receiving section is lower than a predetermined threshold value, it is determined that an object to be detected is present there. In the photoelectric switch of the reflection type, when an object to be detected is present, light projected from the light projecting section is reflected by the object and enters the light receiving section. In this case, when a level of the amount of received light in the light receiving section exceeds a predetermined threshold value, it is determined that the object is present there. A sensitivity of the photoelectric switch is adjusted by varying the threshold value.

One of those photoelectric switches is of the separate type in which the photoelectric switch is separated into a head and a main body. The head contains mainly a light projecting section for projecting light and a light receiving section for receiving light returned from an object to be detected. The main body contains mainly a control unit for controlling the light projecting section and the light receiving section, and a power supply circuit. Further, it contains a display unit for displaying the amount of the received light in the head and a threshold value, and a switch for adjusting the threshold value. The display unit of the main body displays a tolerance level of the light-receiving amount with respect to the threshold value.

The photoelectric switch of the separate type may be used such that when a broad space does not exist near the object to be detected, only the head is located near the object while the main body is located farther from the object.

In installing the photoelectric switch of the separate, reflection type, to prevent noise from giving rise to error, a position of the head must be adjusted, for example, in such a manner that when an object to be detected exists within the detection area, the light-receiving amount is sufficiently high with respect to the threshold value, and when the object does not exist within the detection area, the light-receiving amount is sufficiently low with respect to the threshold value.

In this type of the photoelectric switch, however, when the main body is located far from the head, it is impossible that the operator adjusts the head position while checking a display by the display portion in the main body. This makes it difficult to accurately adjust the head position and impairs workability in adjusting the head position.

SUMMARY OF THE INVENTION

Accordingly, an object of the present invention is to provide a photoelectric switch of the separate type which can accurately and easily check information on a process carried out in the main body even when the main body is located far from the head.

Another object of the present invention is to provide a photoelectric switch of the separate type which can accurately and easily adjust a position of the head even when the main body is located far from the head.

These objects can be achieved by a photoelectric switch of the separate type, according to a first aspect of the present invention, which projects light to a detection area and detects the presence or absence of an object to be detected within the detection area by receiving light returned from the detection area. The photoelectric switch comprises: a head that includes at least a light receiver for outputting a light reception signal based on a light receiving state of light returned from the detection area; and a main body, connected to the head by a signal line, for receiving a light reception signal output from the light receiver through the signal line. In the photoelectric switch the main body includes a processor for detecting the presence or absence of an object to be detected within the detection area by use of the light reception signal received through the signal line from the head, and the head includes an indicator for displaying information on the process carried out by the processor by the main body. The information on the process carried out by the processor is information regarding the detection of the presence of the object executed by the processor.

In the photoelectric switch of the invention, the light receiving section of the head outputs a light reception signal based on a light receiving state of light returned from the detection area, and the light reception signal is applied through the signal line to the main body. In the main body, the processor detects the presence or absence of an object to be detected within the detection area by use of the light reception signal received through the signal line from the head. In the head, the indicator displays information on the process carried out by the processor in the main body.

Thus, the indicator of the head displays information on the process in the main body. Therefore, when the main body is located farther from the head, the operator/user checks information on the process by the processor while watching a display by the indicator of the head.

In the photoelectric switch of the invention, it is preferable that the processor includes: a generator for producing a process signal based on a light reception signal, which is received from the head through the signal line in order to detect the presence or absence of an object to be detected within the detection area; a setting unit for setting a reference value used for determining if the object to be detected is present within the detection area; a detecting unit for determining if the object to be detected is present within the detection area by comparing a process signal produced by the generator with a reference value set by the setting unit; and a calculator for calculating a relative value of the process signal produced by the generator to the reference value set by the setting unit in the form of a tolerance level, wherein an indicator displays a tolerance level calculated by the calculator as information on the process by the processor.

In this case, in the main body, the generator produces a process signal based on a light reception signal, which is received from the head through the signal line in order to detect the presence or absence of an object to be detected within the detection area. The setting unit sets a reference value used for determining whether or not the object to be detected is present within the detection area. The detecting unit determines if the object to be detected is present within the detection area by comparing the process signal produced by the generator with the reference value set by the setting unit. The calculator calculates the relative value of the process signal produced by the generator to the reference value set by the setting unit in the form of a tolerance level. In the head, the indicator displays a tolerance level thus calculated by the calculator as information on the process by the processor.

Thus, the tolerance level is displayed by the indicator of the head. Therefore, even when the main body is installed at a position located far from the head, the operator/user may adjust a position of the head while watching a display by the indicator of the head. Accordingly, the operator/user can accurately and easily adjust a position of the head so that a tolerance level is sufficiently large. Further, workability in adjusting the head position is improved. The operator/user checks if the photoelectric switch stably performs an object detecting operation by watching a display on the head.

Further, in the photoelectric switch of the invention, it is also preferable that the main body further includes a display unit for displaying at least one of a process signal produced by the generator, a reference value set by the setting unit, and a tolerance level calculated by the calculator.

In this case, in the main body, at least one of the process signal, the reference value and the tolerance level is displayed by the display unit. Therefore, the operator/user may recognize the process signal, the reference value or the tolerance level in an easy manner by the display unit of the main body.

Furthermore, in the photoelectric switch of the invention, it is further preferable that the main body further includes a power supply circuit which is connected to the head by a power line, and supplies a voltage based on the tolerance level calculated by the calculator as a power voltage, for driving the head, to the head by way of the power line, and the indicator displays the tolerance level calculated by the calculator of the main body on the basis of the voltage supplied through the power line from the main body.

In this case, the voltage based on the tolerance level calculated by the calculator of the main body is applied as the voltage for driving the head to the head by way of the power line. The tolerance level is displayed by the indicator, on the basis of the supplied voltage. Therefore, a single line is common to the power line for supplying the power voltage for driving the head and the signal line for transmitting the tolerance level. As a result, the increase of the number of signal lines, caused by the display of the tolerance level in the head, is restricted.

Further, in the photoelectric switches of the invention, it is more preferable that the head further includes a light projector for projecting light to the detection area.

In this case, the light projector of the head projects light to the detection area, and the light receiving section of the head receives light returned from said detection area.

The above-mentioned object can be achieved by a photoelectric switch of the separate type, according to a second aspect of the present invention, for detecting an object to be detected in a detection area in a manner such that the photoelectric switch projects light to the detection area and receives light returned from the detection area. The photoelectric switch comprises: a head that includes a light projector for projecting light to within the detection area and a light receiver for outputting a light reception signal based on a light receiving state of light returned from the detection area; and a main body, connected to the head by a signal line and a power line, for receiving a light reception signal output from the light receiver through the signal line. In the photoelectric switch the main body includes a processor for detecting the presence or absence of an object to be detected within the detection area by use of a light reception signal received through the signal line from the head, and a power supply circuit for supplying a voltage representative of information on an operation of the head as a power voltage for driving the head to the head by way of the power line, and the head includes an operating portion for performing a predetermined operation in accordance with the information represented by the voltage supplied from the main body through the power line.

In the photoelectric switch of the invention, a light receiver of the head outputs a light reception signal based on a light receiving state of light returned from the detection area. In the main body, a processor detects the presence or absence of an object to be detected within the detection area by use of a light reception signal received through the signal line from the head. Further, a voltage representative of information on an operation of the head is supplied, as a power voltage for driving the head, to the head by way of the power line. In the head, a predetermined operation is performed in accordance with the information represented by the voltage supplied from the main body through the power line by an operating portion.

Thus, a single line is common to the power line for supplying the power voltage for driving the head and the signal line for transmitting the information of the operation of the head. As a result, the increase of the number of signal lines, caused by the information on the head operation to the head, is restricted.

In the photoelectric switch of the invention, it is preferably advantageous that the information on the operation of the head includes information on the process by the processor, and the operating portion includes an indicator for displaying the information on the process by the processor of the main body on the basis of the voltage supplied from the main body through the power line. The information on the process by the processor is information regarding the detection of the presence of the object executed by the processor.

In this case, the voltage representative of the information on the process by the processor is applied as the power voltage for driving the head and is supplied through the power line to the head. In the head, the information on the process by said processor of the main body is displayed by the indicator on the basis of the voltage supplied from the main body through the power line.

Thus, a single line is common to the power line for supplying the power voltage for driving the head and the signal line for transmitting the tolerance level. As a result, the increase of the number of signal lines, caused by the display of the information on the process by the processor, is restricted.

In the above-mentioned photoelectric switch of the invention, it is further advantageous that the indicator displays information on the processing by the processor in terms of a numerical value.

In this case, information on the processing by the processor of the main body is displayed in terms of a numerical value by the indicator of the head. Therefore, the information on the processing by the processor of the main body may easily be checked on the display in the head.

DETAILED DESCRIPTION OF THE PREFERRED EMBODIMENT

Figure 1:
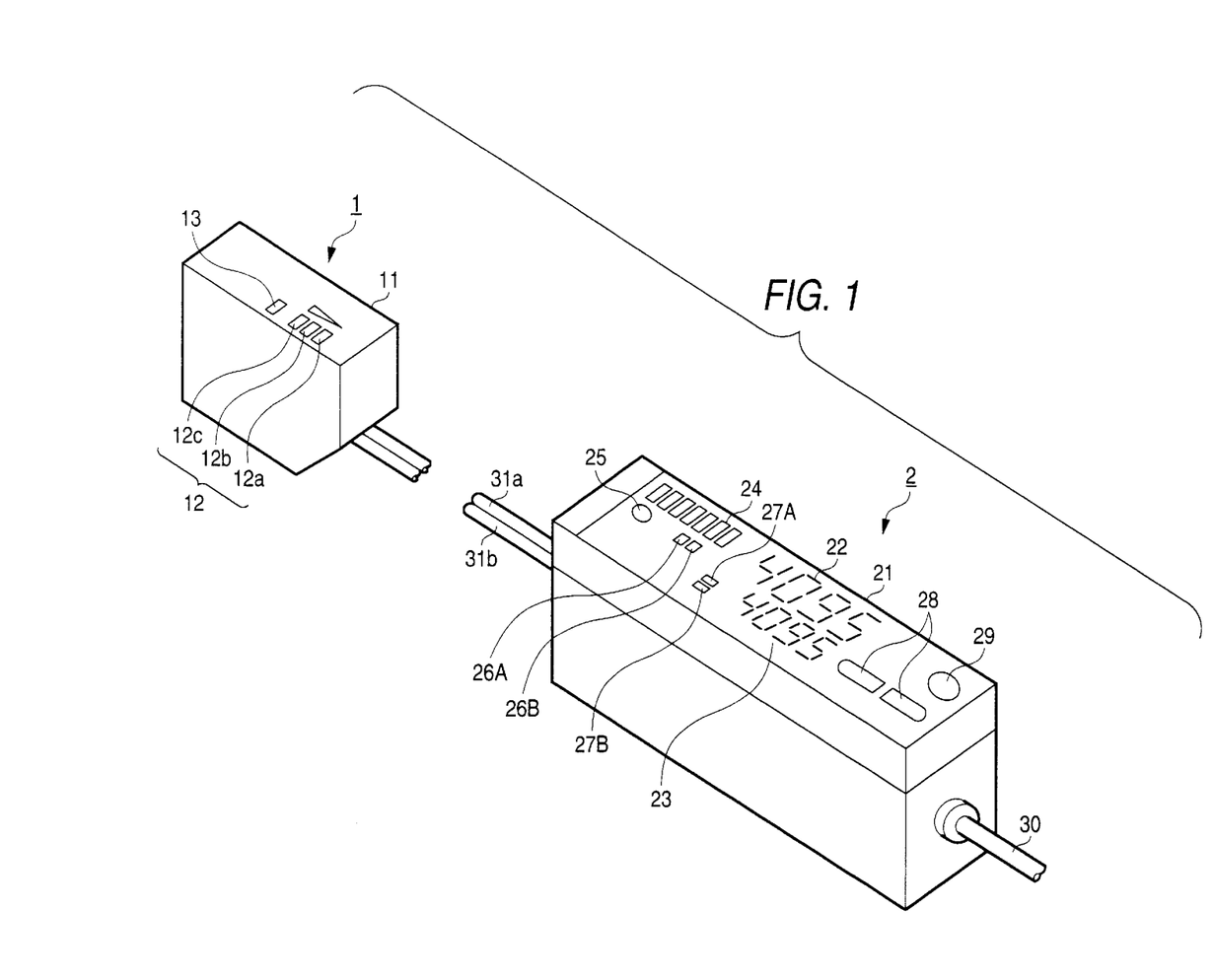
FIG. 1 is a perspective view showing an external appearance of a photoelectric switch of the separate type according to a first embodiment of the present invention.

FIG. 1 is a perspective view showing an external appearance of a photoelectric switch of the separate type according to a first embodiment of the present invention. The photoelectric switch shown in FIG. 1 is of the reflection type.

As shown in FIG. 1, the photoelectric switch of the separate type has a head 1 and a main body 2. The head 1 and the main body 2 are interconnected by cables 31a and 31b.

A casing 11 of the head 1 contains a light projecting section for projecting laser light onto an object to be detected and a light receiving section for receiving light reflected from the object. A tolerance-level display portion 12 and a laser indication lamp 13 are provided on the upper surface of the casing 11. The tolerance-level display portion 12 includes three tolerance-level display LEDs (photo diodes) 12a, 12b, and 12c, and displays a tolerance level to be described later. The laser indication lamp 13 indicates whether a laser diode of the light projecting section light is on or off.

A received light amount display portion 22, a threshold-value display portion 23, a tolerance-level display portion 24, a laser indication lamp 25, operation indication lamps 26A, 26B, channel indication lamps 27A, 27B, adjust switches 28 and a setting switch 29 are provided on the top surface of a casing 21 of the main body 2.

In the photoelectric switch of this embodiment, two threshold values may be set. Two channels "A" and "B" are provided corresponding to those threshold values, respectively. The channel indication lamps 27A and 27B are provided corresponding to those channels "A" and "B", respectively. When the channel "A" is selected, the channel indication lamp 27A light is on, and when the channel "B" is selected, the channel indication lamp 27B light is on.

The operation indication lamps 26A and 26B are provided corresponding to the channels "A" and "B", respectively. When the channel "A" is selected, the operation indication lamp 26A light is either on or off to show whether or not an object to be detected is present within a detection area. When the channel "B" is selected, the operation indication lamp 26B light is either on or off to show whether or not the object is present within the detection area. The laser indication lamp 25 indicates whether a laser diode of the head 1 is on or off.

The received light amount display portion 22 is formed with four 7-segment LEDs, and displays the amount of light received by the head 1 in terms of a numerical value. The threshold-value display portion 23 is formed with 7-segment LEDs, and displays a threshold value in terms of a numerical value. The tolerance-level display portion 24 includes a linear array of a plurality of LEDs, and displays a tolerance level in a bar-graph fashion. In the embodiment, the tolerance level is expressed in terms of a ratio of the amount of received light to the threshold value.

The adjust switches 28 are provided for adjusting a threshold value displayed in the threshold-value display portion 23. The setting switches 29 are provided for setting the threshold value. When the setting switches 29 are depressed in a state wherein an object to be detected is present within the detection area, and then are depressed again in a state wherein the object is absent within the detection area, the threshold value is automatically adjusted to be an intermediate level between the received light amounts when the object is present and absent within the detection area.

The thus set threshold value is displayed by the threshold-value display portion 23. After the threshold value displayed by the threshold-value display portion 23 is adjusted by use of the adjust switches 28, the threshold value adjusted is set as a new threshold value.

An output cable 30 is connected to the end face of the casing 21 of the main body 2. The output cable 30 produces a signal representative of the result of detecting to indicate whether or not an object to be detected is present within the detection area.

Figure 2:
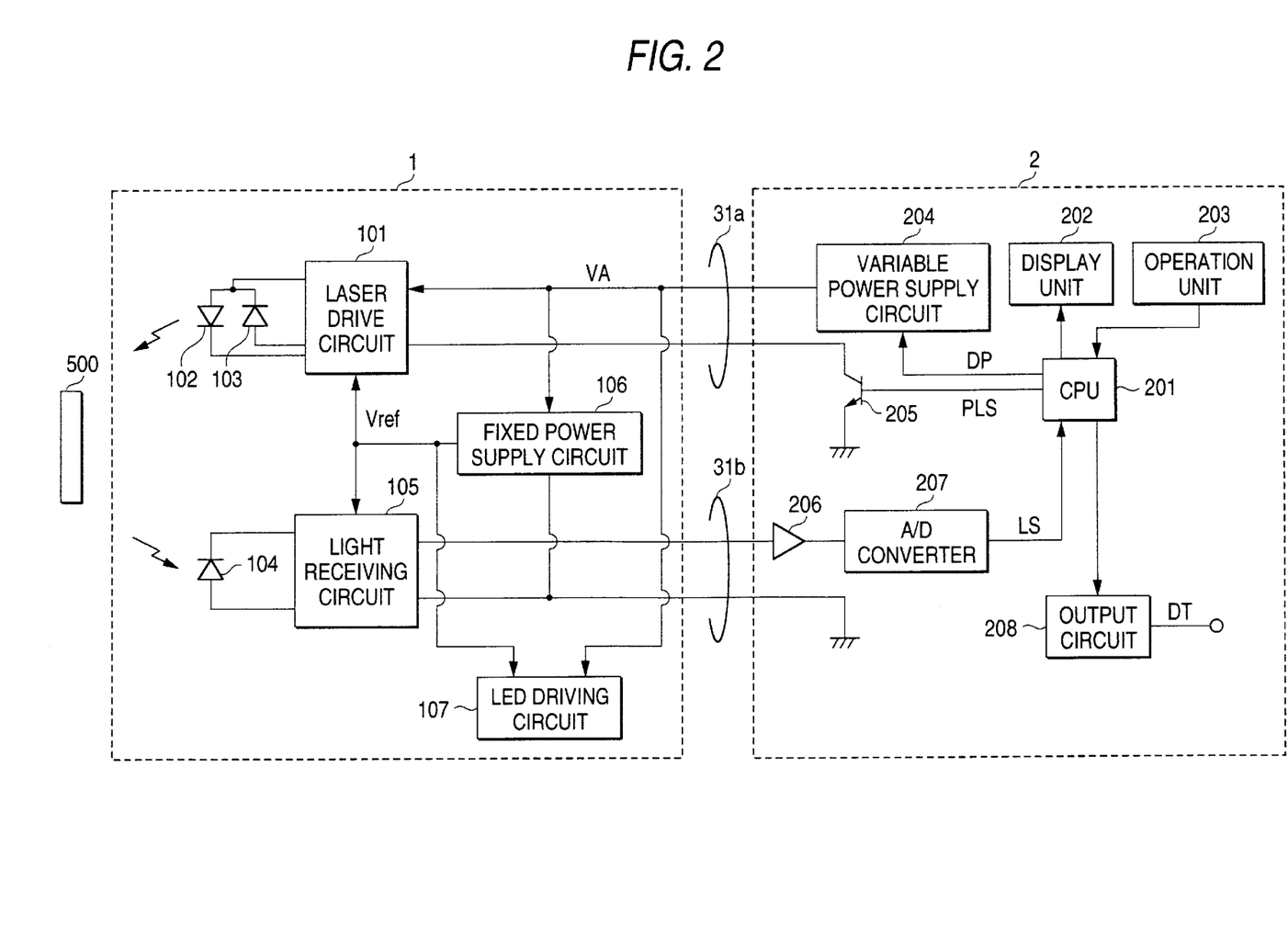
FIG. 2 is a block diagram showing an electrical arrangement of the photoelectric switch of the separate type shown in FIG. 1.
Figure 3A:
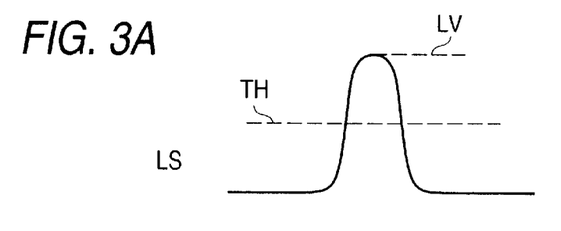
FIGS. 3A–3B are respectively diagrams according to a judging process by use of a light reception signal and a threshold value.
Figure 3B:
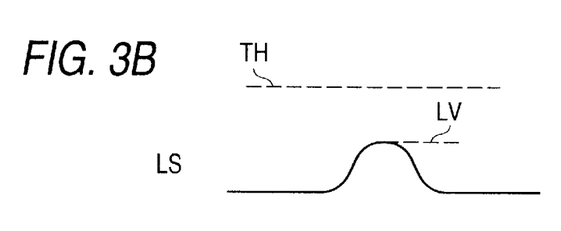

FIG. 2 is a block diagram showing an electrical arrangement of the photoelectric switch of the separate type shown in FIG. 1. FIG. 3 is a diagram useful in explaining a judging process by use of a light reception signal and the threshold value.

The head 1 includes a laser drive circuit 101, a laser diode 102, a photo diode for monitoring 103, a photo diode 104, a light receiving circuit 105, a fixed power supply circuit 106 and an LED driving circuit 107. A light projecting section is composed of the laser drive circuit 101, the laser diode 102 and the photo diode 103. A light receiving section is composed of the photo diode 104 and the light receiving circuit 105. The LED driving circuit 107 includes a tolerance-level display portion 12.

The main body 2 is composed of a CPU (central processing unit) 201, a display unit 202, an operation unit 203, a variable power supply circuit 204, a transistor 205, an amplifier 206, an A/D (analog to digital) converter 207, and an output circuit 208.

The display unit 202 includes the received light amount display portion 22, the threshold-value display portion 23, the tolerance-level display portion 24, the laser indication lamp 25, the operation indication lamp 26A and 26B, and the channel indication lamp 27A and 27B shown in FIG. 1. The operation unit 203 includes the adjust switches 28 and the setting switch 29 shown in FIG. 1.

The CPU 201 of the main body 2 applies a pulse signal PLS for controlling the turn-on/off of the laser diode 102 in the head 1 to the base of the transistor 205. The transistor 205 is turned on and off in response to the pulse signal PLS. The collector of the transistor 205 is connected to the laser drive circuit 101 of the head 1 by way of the cable 31a. With the connection, the laser drive circuit 101 drives the laser diode 102 in response to the pulse signal PLS output from the CPU 201.

When the laser diode 102 is turned on, it emitts a laser beam to a detection area. The monitor photo diode 103 is provided for monitoring the amount of light of the laser beam emitted from the laser diode 102.

When an object to be detected 500 is present within the detection area, light reflected on the object 500 is received by the photo diode 104. The light receiving circuit 105 outputs an analog light reception signal RS corresponding to the amount of light received by the photo diode 104. The light reception signal RS output from the light receiving circuit 105 is applied to the main body 2 by way of the cable 31b.

The amplifier 206 in the main body 2 amplifies a light reception signal RS output from the light receiving circuit 105. The A/D converter 207 converts the light reception signal RS amplified by the amplifier 206, and applies it as a digital light reception signal LS to the CPU 201.

A threshold value TH is set in advance in the CPU 201 by operating the setting switch 29 and adjust switches 28 in the operation unit 203. The CPU 201 compares a signal level of the light reception signal LS received from the A/D converter 207 with a threshold value TH. The CPU detects the presence or absence of the object 500 within the detection area, and outputs a detect signal DT representative of the detection result, through the output circuit 208, from the output cable 30 shown in FIG. 1.

When the signal level LV of the light reception signal LS is higher than the threshold value TH as shown in FIG. 3A, the CPU determines that the object 500 is present within the detection area. When the signal level LV of the light reception signal LS is lower than the threshold value TH as shown in FIG. 3B, the CPU determines that the object 500 is absent from the detection area.

The CPU 201 calculates a ratio of the signal level LV of the light reception signal LS to the threshold value TH, thereby obtaining a tolerance level. In the case of FIG. 3A, the tolerance level is larger than 1. In the case of the FIG. 3B, the tolerance level is smaller than 1.

The CPU 201 applies a control signal DP, corresponding to the calculated tolerance level, to the variable power supply circuit 204. The variable power supply circuit 204 supplies a variable voltage VA, corresponding to the control signal DP, to the head 1 via the cable 31a. When the tolerance level is larger than 1, the level of the variable voltage VA lowers, and when the tolerance level is smaller than 1, the level of the variable voltage VA increases. Thus, the level of the variable voltage VA represents the tolerance level.

The variable voltage VA is applied to the laser drive circuit 101, the fixed power supply circuit 106, and the LED driving circuit 107 in the head 1. The fixed power supply circuit 106 receives a variable voltage VA, and applies a reference voltage Vref to the laser drive circuit 101, the light receiving circuit 105, and the LED driving circuit 107. The laser drive circuit 101 controls the amount of light emitted by the laser diode 102 in accordance with a current flowing through the photo diode 103. The amount of light emitted by the laser diode 102 is invariable irrespective of the level of the variable voltage VA.

The LED driving circuit 107, as will be described later, turns on or off the tolerance-level display LEDs 12a, 12b and 12c of FIG. 1 in accordance with the level of the variable voltage VA.

In the embodiment, the photo diode 104 and the light receiving circuit 105 correspond to a light receiver; and the CPU 201, the operation unit 203 and the A/D converter 207 correspond to a processor. The A/D converter 207 corresponds to a generator; the CPU 201 and the operation unit 203 correspond to a setting unit; the CPU 201 corresponds to a detecting unit and a calculator. The tolerance-level display portion 12 corresponds to an indicator; and the display unit 202 corresponds to a display unit. The laser drive circuit 101 and the laser diode 102 correspond to a light projector; the cable 31a corresponds to a power line; and the cable 31b corresponds to a signal line. The LED driving circuit 107 and the tolerance-level display portion 12 correspond to an operating portion. The tolerance level corresponds to information regarding the detection of the object executed by the processor; the light reception signal LS corresponds to a process signal; and the threshold value TH corresponds to a reference value.

Figure 4:
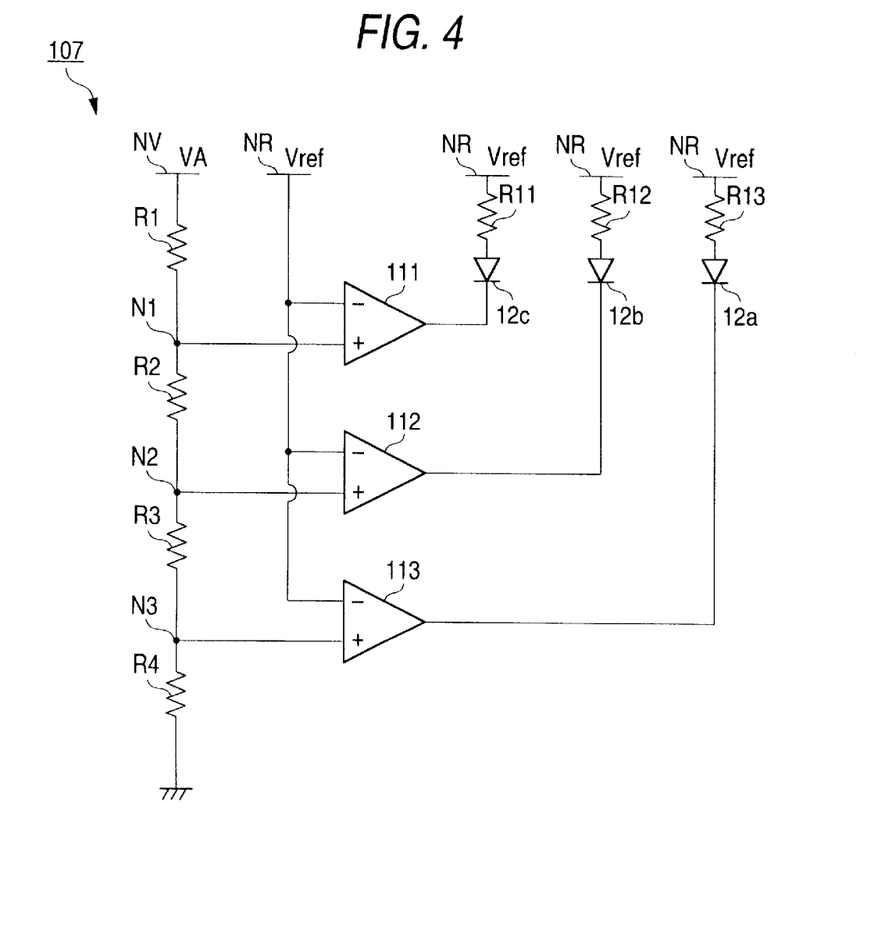
FIG. 4 is a circuit diagram showing an electrical arrangement of the LED driving circuit in the head of FIG. 2.

FIG. 4 is a circuit diagram showing an electrical arrangement of the LED driving circuit 107 shown in FIG. 2. As shown in FIG. 4, the LED driving circuit 107 includes resistors R1, R2, R3, R4, R11, R12 and R13, comparators 111, 112 and 113, and tolerance-level display LEDs 12a, 12b and 12c.

Resistors R1, R2, R3 and R4 are connected in series to between a power source terminal NV for receiving a variable voltage VA and a ground terminal. One of the input terminals of the comparator 111 is connected to a node N1 between the resistors R1 and R2; one of the input terminals of the comparator 112 is connected to a node N2 between the resistors R2 and R3; and one of the input terminals of the comparator 113 is connected to a node N3 between the resistors R3 and R4.

The other input terminals of the comparators 111 to 113 are connected to a power source terminal NR for receiving a reference voltage Vref. The output terminal of the comparator 111 is connected to the power source terminal NR by way of the tolerance-level display LED 12c and the resistor R11. The output terminal of the comparator 112 is connected to the power source terminal NR by way of the tolerance-level display LED 12b and the resistor R12. The output terminal of the comparator 113 is connected to the power source terminal NR by way of the tolerance-level display LED 12a and the resistor R13.

The comparators 111 to 113 compare potentials at the nodes N1 to N3 with the reference voltage Vref, respectively.

When the variable voltage VA drops to a first level as the lowest level or lower than the first level, and the potentials at the nodes N1 to N3 drop below the reference voltage Vref, the output signals of the comparators 111 to 113 are set low in logic level. Accordingly, current flows through the tolerance-level display LEDs 12a to 12c, so that those LEDs are turned on.

When the variable voltage VA drops to a second level, which is higher than the first level and the second low level in the ascending order, and the potentials at the nodes N2 and N3 are both below the reference voltage Vref, the output signals of the comparators 112 and 113 are set low in logic level. Accordingly, current flows through the tolerance-level display LEDs 12a and 12b, so that those LEDs are turned on.

When the variable voltage VA drops to a third level, which is higher than the second level and the third low level in the ascending order, and the potential at the node N3 is below the reference voltage Vref, the output signal of the comparator 113 is set low in logic level. Accordingly, current flows through the tolerance-level display LED 12a, so that the LED is turned on.

When the variable voltage VA exceeds the third level and the potential at the node N3 increases above the reference voltage Vref, the output signals of the comparators 111 to 113 are set all high in logic level. As a result, the tolerance-level display LEDs 12a to 12c are not turned on.

Thus, for example, when the tolerance level is 1.1 (110%) or larger, three tolerance-level display LEDs 12a to 12c are turned on. When the tolerance level is within a range from 1 (100%) to a value of smaller than 1.1 (110%), two tolerance-level display LEDs 12a and 12b are turned on. When the tolerance level is within a range from 0.9 (90%) to a value of smaller than 1 (100%), one tolerance-level display LED 12a is turned on. When the tolerance level is smaller than 0.9 (90%), the tolerance-level display LEDS 12a to 12c are all turned off.

In particular, when the tolerance level is high and those three tolerance-level display LEDs 12a to 12c are turned on, the voltage level of the variable voltage VA is the lowest. Therefore, the amount of heat generated in the head 1 when it stably detects the object to be detected is small. This prevents deterioration of the performances of the laser diode 102 due to the heat.

In the photoelectric switch of the embodiment of FIG. 1, a tolerance level is displayed by the tolerance-level display portion 12 of the head 1. Accordingly, the operator can adjust a position of the head 1 while watching a display by the tolerance-level display portion 12 of the head 1. Therefore, the operator can accurately and easily make a position adjustment of the head 1 so that when an object to be detected 500 is present within the detection area, the tolerance level is sufficiently larger than "1", and so that when an object to be detected 500 is present within the detection area, the tolerance level is sufficiently smaller than "1". Further, workability is improved in the position adjusting of the head 1.

Since the tolerance level is displayed in the main body 2 of the head 1, the operator can easily check if the photoelectric switch performs a stable object detecting operation without watching the display by the main body 2.

A tolerance level calculated by the CPU 201 of the main body 2 is transmitted to the head 1 by the variable voltage VA used as the power voltage to the head 1. Therefore, there is no need of using the signal line for the tolerance level transmission. And hence the increase of the number of cables caused by the display of the tolerance level by the head 1 is restricted.

In the embodiment, the tolerance level is expressed in terms of a ratio of the signal level LV of the amount of received light to the threshold value TH. The tolerance level may also be expressed in the form of a difference between the signal level LV of the amount of received light and the threshold value TH.

In the photoelectric switch of the embodiment of FIG. 1, the laser diode 102 is used for the light emitting element of the light projecting section. If required, an LED may be used for the light emitting element.

In the photoelectric switch of the embodiment, the main body 2 includes a received light amount display portion 22, the threshold-value display portion 23 and the tolerance-level display portion 24. Alternatively, the main body 2 may include the received light amount display portion 22 and threshold-value display portion 23 or it may include the threshold-value display portion 23 and the tolerance-level display portion 24.

Also in the photoelectric switch of the embodiment, the tolerance-level display portion 12 displays a tolerance level in a bar graph fashion by use of the plurality of the tolerance-level display LEDs 12a, 12b and 12c. Alternatively, it may be displayed in a numerical value by the tolerance-level display portion.

Further, the photoelectric switch discussed in the embodiment mentioned above is of the reflection type, but it may be of the transmission type. In this case, the head 1 of FIG. 2 is separated into a light projection head and a light receiving head. The light projection head includes the laser drive circuit 101 and the laser diode 102, and the light receiving head includes a photo diode 104, the light receiving circuit 105, the fixed power supply circuit 106, and the LED driving circuit 107, and further includes the tolerance-level display portion 12 of FIG. 1. The light projection head may also include the tolerance-level display portion 12.

The present invention may be applied to a photoelectric switch of a triangular distance measuring type, which is based on the principle of the triangulation. The photoelectric switch of the triangular distance measuring type will be described.

Figure 5:
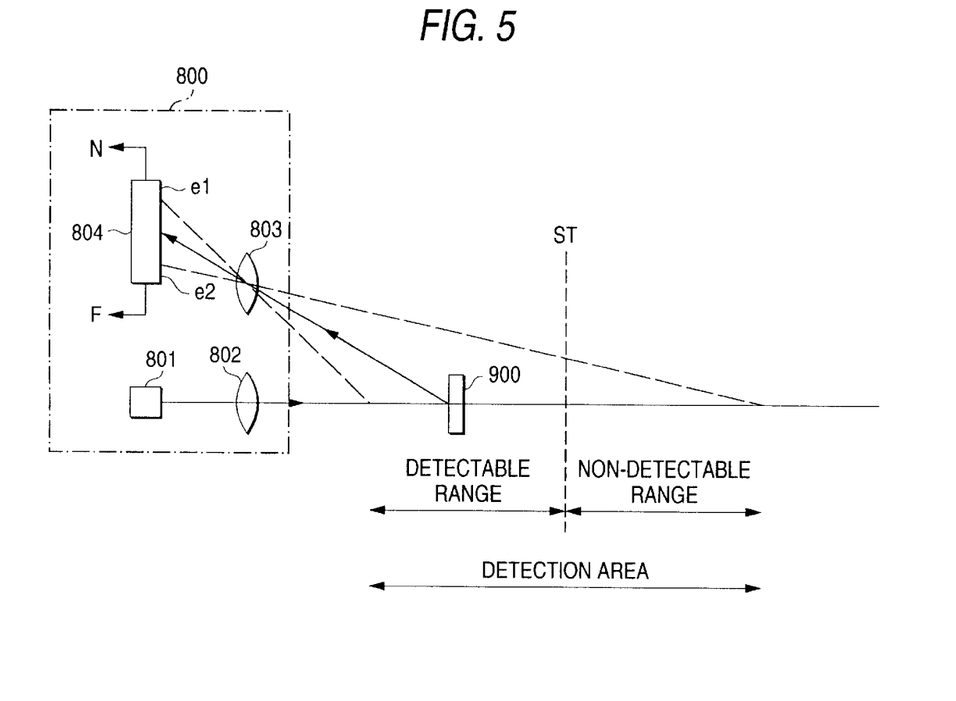
FIG. 5 is a diagram showing a major portion of a head of the photoelectric switch of the triangular distance measuring type according to a second embodiment of the present invention.

FIG. 5 is a diagram showing a major portion of a head of the photoelectric switch of the triangular distance measuring type according to a second embodiment of the present invention.

In FIG. 5, a head 800 includes an LED 801, a light projection lens 802, a light receiving lens 803 and a PSD (photo position detecting element) 804. The head 800 is also provided with the tolerance-level display portion 12 shown in FIG. 1 (not shown in FIG. 5).

Light emitted from the LED 801 is projected onto an object to be detected 900 through the light projection lens 802. Light reflected from the object 900 is received as a light spot on the light receiving surface of the PSD 804, through the light receiving lens 803.

A position of the light spot on the light receiving surface of the PSD 804 moves depending on a distance between the head 800 and the object 900. When the object 900 moves toward the head 800, the light spot is formed at a position on one end (first end) e1 of the light receiving surface of the PSD 804. When it moves away from the head 800, the light spot is formed at a position on the other end (second end) e2 of the light receiving surface.

The PSD 804 outputs two light reception signals N and F corresponding to the positions of the light spot on the light receiving surface. The light reception signal N has a signal level (current value) proportional to a distance from the first end e1 of the light receiving surface of the PSD 804 to the light spot landing thereon. The light reception signal F has a signal level (current value) proportional to a distance from the second end e2 of the light receiving surface of the PSD 804 to the light spot landing thereon. Accordingly, a distance from the head 800 to the object 900 can be measured by use of two light reception signals N and F.

The detection area is a range along the optical axis of the emitting light from the LED 801. When an object to be detected exists within this range, light reflected from the object is incident on the light receiving surface of the PSD 804. A predetermined position ST is set within the detection area. A sub-area closer to the head 800 with respect to the predetermined position ST is a detectable range. A sub-area farther from the head 800 with respect to the predetermined position ST is a non-detectable range. When the PSD 804 receives reflecting light from the detectable range, the head 800 of the photoelectric switch determines that an object to be detected 900 exists.

Figure 6A:
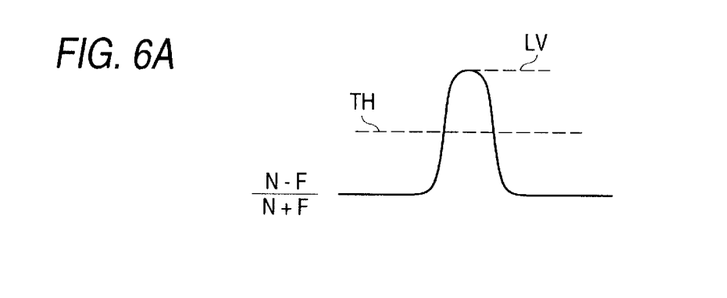
FIGS. 6A–6B are respectively diagrams according to a judging process by use of a light reception signal and a threshold value.
Figure 6B:
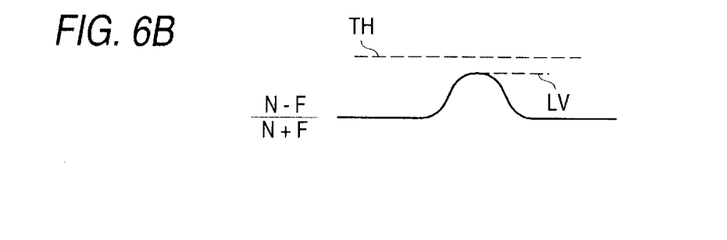

FIGS. 6A and 6B are respectively diagrams for explaining a judging process by use of the light reception signals N and F output from the PSD 804.

A difference (N−F) of the light reception signals N and F corresponds to a position of the object 900 within the detection area. In an actual judging process, the signal difference (N−F) is normalized by dividing it by (N+F) corresponding to the total amount of received light, to thereby obtain a position signal (N−F)/(N+F). This position signal is used as position information representative of a position of the object 900 in the detection area.

As shown in FIG. 6A, when the signal level LV of the position signal is higher than the threshold value TH, it is determined that the object 900 exists in the detectable range. As shown in FIG. 6B, when the signal level LV of the position signal is lower than the threshold value TH, it is determined that the object 900 does not exist in the detectable range. The setting position ST within the detection area may be moved by adjusting the threshold value TH.

In the photoelectric switch of FIG. 5, a ratio of the signal level LV to the threshold value TH is a tolerance level. In the case of FIG. 6A, the tolerance level is expressed by a value larger than "1". In the case of FIG. 6B, the tolerance level is expressed by a value smaller than "1". When the object 900 is present at a position sufficiently apart from the predetermined position ST within the detectable range, the tolerance level is sufficiently larger than "1".

The main body of the photoelectric switch of the embodiment includes the threshold-value display portion 23 and the tolerance-level display portion 24 shown in FIG. 1, and further includes a position information display portion for displaying position information, in stead of the received light amount display portion 22. The remaining construction of the embodiment is substantially equal to that of the photoelectric switch shown in any of FIGS. 1 to 4.

In the embodiment, the PSD 804 corresponds to a light receiver, and the LED 801 corresponds to a light projector. The tolerance level corresponds to information regarding the detection of the object executed by the processor; the position signal corresponds to a process signal; and the threshold value TH corresponds to a reference value.

Also in the photoelectric switch of the embodiment, a tolerance level is displayed by the tolerance-level display portion of the head 800. Therefore, also when the main body is located apart from the head 800, the operator can adjust a position of the head 800 while watching a display by the tolerance-level display portion of the head 800. Accordingly, the position adjustment of the head 800 can accurately and easily be performed so that when the object to be detected 900 exists within the detectable range of the detection area, the value of the tolerance level is sufficiently larger than "1", and that when the object 900 does not exist within the detectable range of the detection area, the value of the tolerance level is sufficiently smaller than "1". Accordingly, workability in the position adjustment of the head 800 is improved.

Also in the embodiment, the tolerance level may be expressed in terms of a ratio of the signal level LV of the position signal to the threshold value TH. In this case, the tolerance level represents a displacement of the object 900 relative to the predetermined position ST.

In the embodiment, the photoelectric switch is of the separate type which consists of one main body and one head. It is evident that the present invention may be applied to a photoelectric switch of the type which consists of one main body and a plurality of heads. In this case, each head is provided with the tolerance-level display portion 12 shown in FIG. 1.

Figure 7:
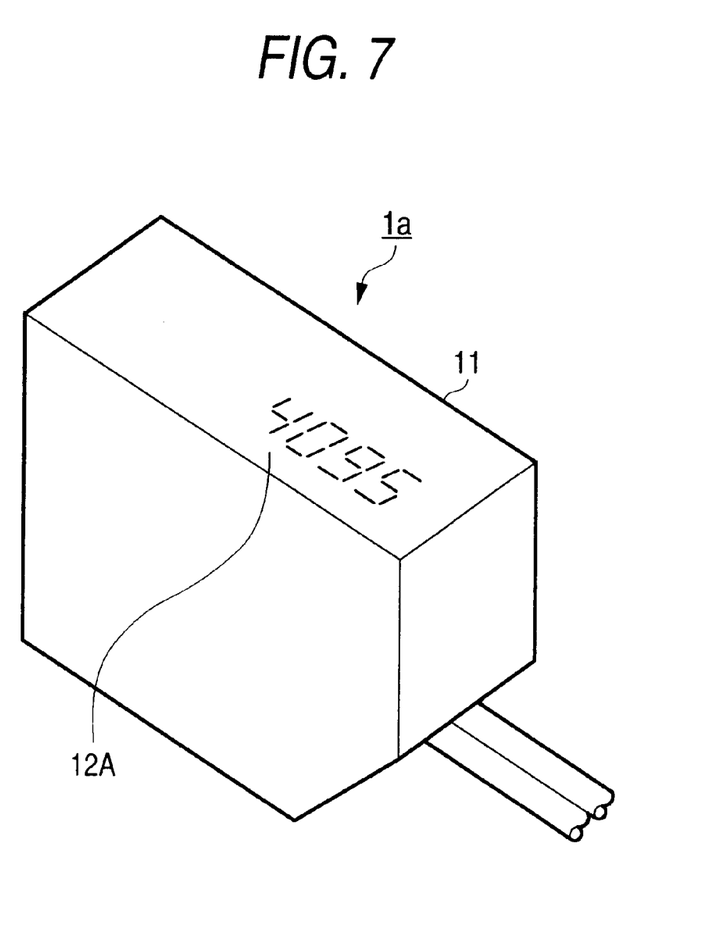
FIG. 7 is a perspective view showing an external appearance of a head of a photoelectric switch of the separate type according to a third embodiment of the present invention.

FIG. 7 is a perspective view showing an external appearance of a head of a photoelectric switch of the separate type according to a third embodiment of the present invention. The main body of the FIG. 7 photoelectric switch is substantially the same as that of the FIG. 1 photoelectric switch.

In FIG. 7, a tolerance-level display portion 12A is provided on the top surface of the casing 11 of the head 1a. The tolerance-level display portion 12A consists of four 7-segment LEDs, and displays a tolerance level in terms of a numerical value.

Figure 8:
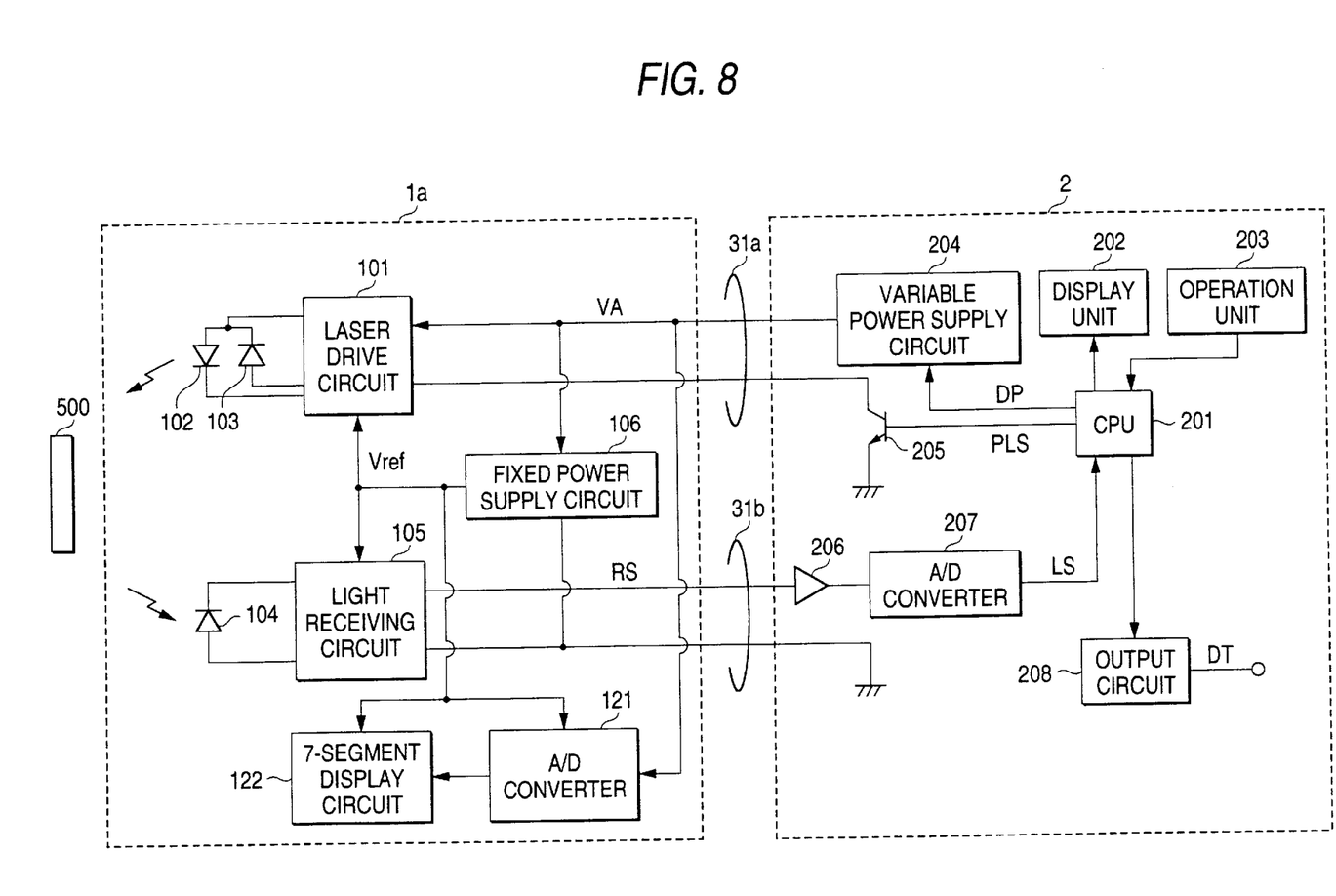
FIG. 8 is a block diagram showing an electrical arrangement of a photoelectric switch of the separate type shown in FIG. 7.

FIG. 8 is a block diagram showing an electrical arrangement of a photoelectric switch of the separate type shown in FIG. 7. The photoelectric switch of FIG. 8 is different from that of FIG. 2 in that an A/D converter 121 and a 7-segment display circuit 122 are provided in the head 1a, instead of the LED driving circuit 107. In this embodiment, the tolerance-level display portion 12A corresponds to an indicator; and the A/D converter 121, the 7-segment display circuit 122 and the tolerance-level display portion 12A correspond to an operating portion.

A variable voltage VA, which is supplied from the variable power supply circuit 204 of the main body 2 through the cable 31a to the head 1a, is applied to the A/D converter 121. A fixed reference voltage Vref is applied from the fixed power supply circuit 106 to the A/D converter 121 and the 7-segment display circuit 122. The A/D converter 121 converts a variable voltage VA into a digital signal representative of a tolerance level, and applies the converted one to the 7-segment display circuit 122. The 7-segment display circuit 122 causes the tolerance-level display portion 12A, which consists of 7-segment LEDs shown in FIG. 7, to display a tolerance level in numerical value in accordance with the digital signal received.

In the photoelectric switch of the embodiment, a tolerance level calculated by the CPU 201 of the main body 2 is transmitted to the head 1a by the variable voltage VA used as the power voltage to the head 1a. Therefore, there is no need of a signal line for transmitting the tolerance level. This results in restriction of the increase of the number of the cables caused by the display of the tolerance level by the head 1a.

The photoelectric switch of the embodiment may include select means by which of the tolerance level, the threshold value and the amount of received light, two or three items are selectively displayed in the head 1a.

Figure 9:
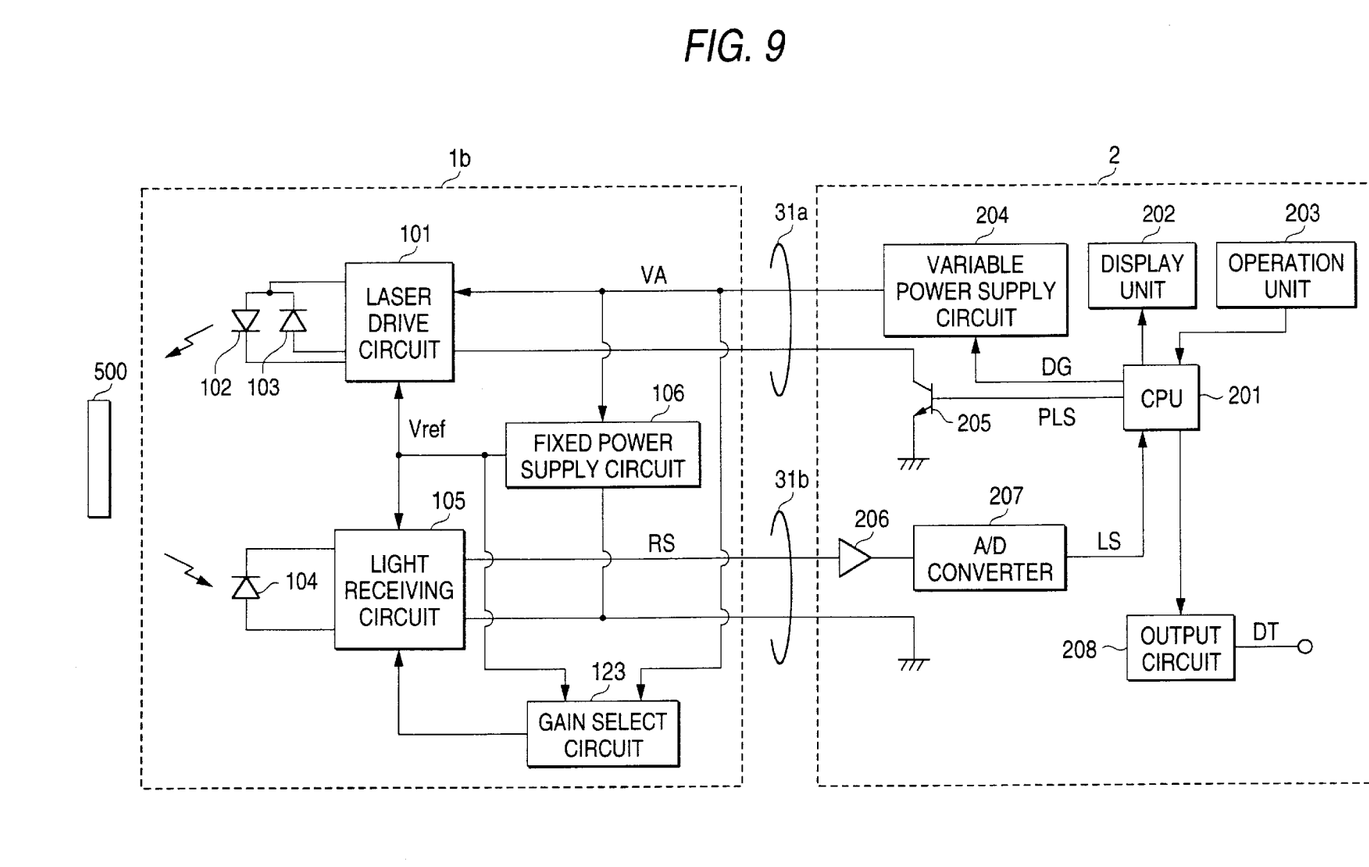
FIG. 9 is a block diagram showing an electrical arrangement of a photoelectric switch of the separate type according to a fourth embodiment of the invention.

FIG. 9 is a block diagram showing an electrical arrangement of a photoelectric switch of the separate type according to a fourth embodiment of the invention.

The photoelectric switch of FIG. 9 is different from the FIG. 2 photoelectric switch in that a gain select circuit 123 is provided in the head 1b, instead of the LED driving circuit 107. In the embodiment, the gain select circuit 123 and the light receiving circuit 105 correspond to an operating portion.

The CPU 201 of the main body 2 applies a control signal DG for selecting a gain of the light receiving circuit 105 of the head 1 to the variable power supply circuit 204. The variable power supply circuit 204 supplies a variable voltage VA, which is dependent on the control signal DG, through the cable 31a to the head 1b. The variable voltage VA is also applied to the gain select circuit 123. Further, a fixed reference voltage Vref is applied from the fixed power supply circuit 106 to the gain select circuit 123. The gain select circuit 123 selects a gain of the light receiving circuit 105 in accordance with a level of the variable voltage VA.

Figure 10:
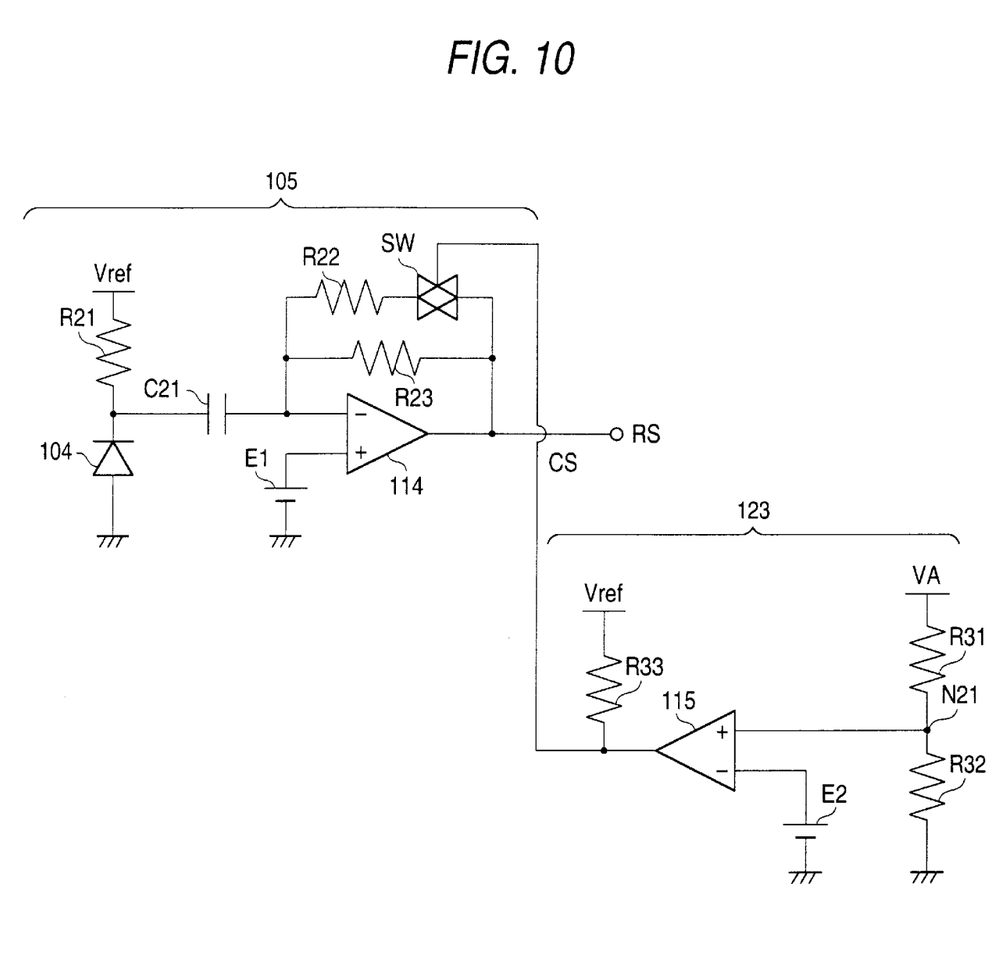
FIG. 10 is a circuit diagram showing an electrical arrangement including the light receiving circuit and the gain select circuit shown in FIG. 9.

FIG. 10 is a circuit diagram showing an electrical arrangement including the light receiving circuit 105 and the gain select circuit 123 shown in FIG. 9.

The light receiving circuit 105 includes an operational amplifier 114, resistors R21, R22, R23, a capacitor C21 and a switching element SW. The gain select circuit 123 includes a comparator 115 and resistors R31, R32, R33.

A potential at a node N21 between the resistors R31 and R32 in the gain select circuit 123 varies in accordance with a level of the variable voltage VA. The comparator 115 compares the potential at the node N21 with a reference potential of a DC power source E2, and applies the comparison result as a switch control signal CS to the switching element SW in the light receiving circuit 105. The operational amplifier 114, the capacitor C21 and the resistors R22 and R23 in the light receiving circuit 105 cooperate to form an amplifier circuit. The switching element SW is turned on or off in response to the switch control signal CS output from the gain select circuit 123, so that a gain of the amplifier circuit is selected. Accordingly, a level of the light reception signal RS output form the light receiving circuit 105 varies.

In the photoelectric switch of the embodiment, the control signal DG for selecting the gain of the light receiving circuit 105, which is output from the CPU 201 of the main body 2, is transmitted to the head 1b by the variable voltage VA used as the power voltage of the head 1b. Therefore, there is no need of the signal line for transmitting the gain-select control signal DG. Therefore, the photoelectric switch of the embodiment may select the gain of the light receiving circuit 105 in the head 1b, from the main body 2 without increasing the number of the cables.

Figure 11:
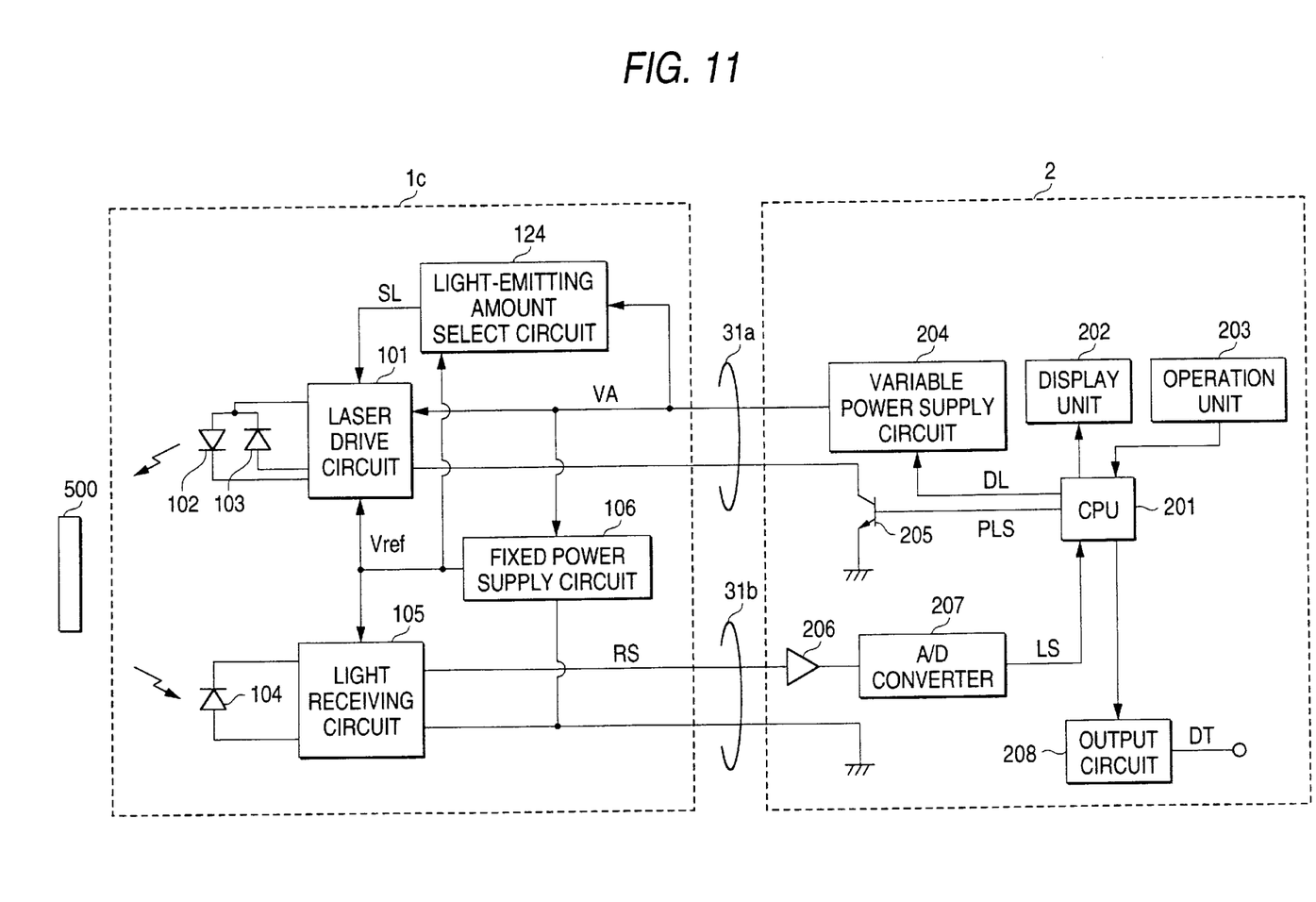
FIG. 11 is a block diagram showing an electrical arrangement of a photoelectric switch of the separate type according to a fifth embodiment of the present invention.

FIG. 11 is a block diagram showing an electrical arrangement of a photoelectric switch of the separate type according to a fifth embodiment of the present invention.

The FIG. 11 photoelectric switch is different from the FIG. 2 photoelectric switch in that a light-emitting amount select circuit 124 is provided in the head 1c, instead of the LED driving circuit 107. In the embodiment, the light-emitting amount select circuit 124, the laser drive circuit 101 and the laser diode 102 correspond to an operating portion.

The CPU 201 of the main body 2 applies a control signal DL for selecting the amount of light emitted from the laser diode 102 in the head 1c to the variable power supply circuit 204. The variable power supply circuit 204 supplies a variable voltage VA, which is dependent on the control signal DL, through the cable 31a to the head 1c. This variable voltage VA is applied to the light-emitting amount select circuit 124. A fixed reference voltage Vref is applied from the fixed power supply circuit 106 to the light-emitting amount select circuit 124. The light-emitting amount select circuit 124 applies a light-emitting amount select signal SL to the laser drive circuit 101 in accordance with a level of the variable voltage VA. The laser drive circuit 101 varies a current to be supplied to the laser diode 102, in response to the light-emitting amount select signal SL incoming from the light-emitting amount select circuit 124.

Figure 12:
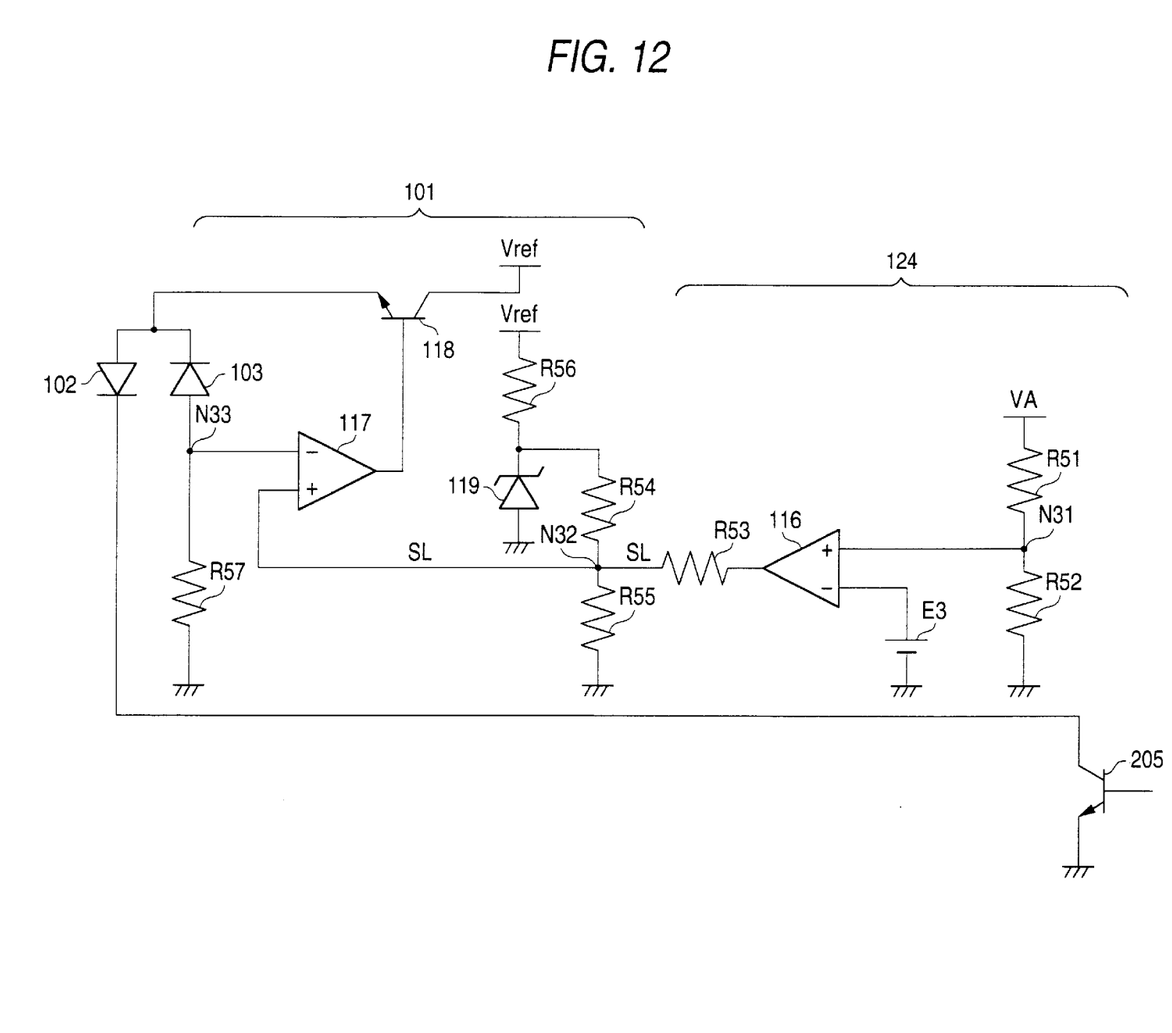
FIG. 12 is a circuit diagram showing an electrical arrangement including the laser drive circuit and the light-emitting amount select circuit shown in FIG. 11.

FIG. 12 is a circuit diagram showing an electrical arrangement including the laser drive circuit 101 and the light-emitting amount select circuit 124, which are shown in FIG. 11.

As shown in FIG. 12, the laser drive circuit 101 includes a comparator 117, a transistor 118, a constant voltage diode 119 and resistors R54, R55, R56 and R57. The light-emitting amount select circuit 124 includes a comparator 116 and resistors R51, R52 and R53.

A potential at a node N31 between the resistors R51 and R52 in the light-emitting amount select circuit 124 varies in accordance with a variable voltage VA. The comparator 116 compares a potential at the node N31 with a reference potential of a DC power source E3, and outputs the comparison result as the light-emitting amount select signal SL to a node N32. The comparator 117 of the laser drive circuit 101 compares a level of the light-emitting amount select signal SL output to the node N32 with a potential at a node N33 between the photo diode 103 and the resistor R57, and applies its output signal representative of the comparison result to the base of the transistor 118. The emitter current of the transistor 118 varies in accordance with a level of the output signal of the comparator 117. As a result, the amount of the current fed to the laser diode 102 varies, and the amount of light emitted from the laser diode 102 varies.

In the photoelectric switch of the embodiment, the control signal DL for selecting the amount of light from the laser diode 102, which is output from the CPU 201 of the main body 2, is transmitted to the head 1c through the variable voltage VA used as the power voltage of the head 1c. Therefore, there is no need of using a signal line for transmitting the control signal DL. Accordingly, the amount of light emitted from the laser diode 102 of the head 1c can be selected from the main body 2 without increasing the number of the cables.

What is claimed is:

1. A separate type photoelectric switch which detects an object in a detection area, said separate type photoelectric switch comprising:
   a head having a light receiver which receives a light from said detection area and outputs a light reception signal based on the received light; and
   a main body located separately from said head and having a processor which detects the object in said detection area on the basis of the light reception signal,
   wherein said head includes an indicator which displays information regarding the detection of the object executed by said processor.

2. The separate type photoelectric switch according to claim 1, wherein said processor comprises:
   a generator for producing a process signal based on the light reception signal;
   a setting unit for setting a reference value ; and
   a detecting unit for detecting the object in said detection area by comparing the process signal with the reference value.

3. The separate type photoelectric switch according to claim 2, wherein said processor further comprises a calculator which calculates a relative value of the process signal to the reference value, and said indicator displays a tolerance level based on the relative value.

4. The separate type photoelectric switch according to claim 3, wherein said main body further comprises a display unit for displaying at least one of the process signal, the reference value, and the tolerance level.

5. The separate type photoelectric switch according to claim 3, wherein said main body further comprises a power supply circuit which supplies said head with a power voltage for driving said head, the power voltage being a voltage representative of the relative value calculated by said calculator, and said indicator displays the tolerance level on the basis of the voltage supplied from said main body.

6. The separate type photoelectric switch according to claim 4, wherein said main body further comprises a first display for displaying the reference value comprising a plurality of digit numbers, and an adjustable switch for adjusting the reference value displayed on said first display.

7. The separate type photoelectric switch according to claim 6, wherein said main body further comprises a second display for displaying the relative value calculated by said calculator as a ratio of the process signal to the reference value.

8. The separate type photoelectric switch according to claim 6, wherein said main body further comprises a third display for displaying the process signal comprising a plurality of digit numbers.

9. The separate type photoelectric switch according to claim 6, wherein said processing means further comprises a second display for displaying the relative value calculated by said calculating means as a ratio of the process signal to the reference value.

10. The separate type photoelectric switch according to claim 6, wherein said processing means further comprises a third display for displaying the process signal comprising a plurality of digit numbers.

11. The separate type photoelectric switch according to claim 1, wherein said main body further comprises a power supply circuit which supplies said head with a power voltage for driving said head, the power voltage being a voltage representative of the information regarding the detection of the presence of the object, and said indicator displays the information on the basis of the voltage supplied from said main body.

12. The separate type photoelectric switch according to claim 1, wherein said head further comprises a light projector projecting a light to said detection area.

13. The separate type photoelectric switch according to claim 1, wherein said indicator displays the information in terms of a numerical value.

14. The separate type photoelectric switch according to claim 5, further comprising:
    a signal line through which said main body receives the light reception signal output from said light receiver of said head; and
    a power line through which said power supply circuit provides the power voltage to said head.

15. A separate type photoelectric switch which detects an object in a detection area, said separate type photoelectric switch comprising:
    a head having a light projector which projects a light to said detection area, and a light receiver which receives the light from said detection area and outputs a light reception signal based on the received light;
    a main body being formed separately from said head and having a processor which detects the object in said detection area on the basis of the light reception signal; and
    a power supply circuit for supplying said head with a power voltage for driving said head, the power voltage being a voltage representative of information on an operation of said head,
    wherein said head includes an operating portion for performing a predetermined operation in accordance with the information represented by the voltage supplied from said main body.

16. The separate type photoelectric switch according to claim 15, wherein the information on the operation of said head includes information regarding the detection of the presence of said object executed by said processor, and said operating portion includes an indicator displaying the information on the basis of the voltage supplied from said main body.

17. The separate type photoelectric switch according to claim 16, wherein said indicator displays the information in terms of a numerical value.

18. The separate type photoelectric switch according to claim 15, wherein the information on the operation of said head includes information on the gain of said light receiver, and said operating portion includes a gain select unit for changing the gain of said light receiver on the basis of the voltage supplied from said main body.

19. The separate type photoelectric switch according to claim 15, wherein the information on the operation of said head includes information on the amount of light emitted by said light projector, and said operating portion includes a light-emitting amount select unit for changing the light emitting amount emitted by said light projector on the basis of the voltage supplied from said main body.

20. The separate type photoelectric switch according to claim 15, further comprising:
    a signal line through which said main body receives the light reception signal output from said light receiver of said head; and
    a power line through which said power supply circuit provides the power voltage to said head.

21. A separate type photoelectric switch which detects an object in a detection area, said separate type photoelectric switch comprising:
    light receiving means for receiving light from said detection area and outputting a light reception signal based on the received light; and
    processing means separate from said light receiving means for detecting the object in said detection area on the basis of the light reception signal,
    wherein said light receiving means includes an indicating means for displaying information regarding the detection of the object executed by said processing means.

22. The separate type photoelectric switch according to claim 21, wherein said processing means comprises:
    a generator means for producing a process signal based on the light reception signal;
    a setting means for setting a reference value; and
    a detecting means for detecting an object in said detection area by comparing the process signal with the reference value.

23. The separate type photoelectric switch according to claim 22, wherein said processing means further comprises a calculating means for calculating a relative value of the process signal to the reference value, and said indicating means displays a tolerance level based on the relative value.

24. The separate type photoelectric switch according to claim 23, wherein said processing means further comprises a display means for displaying at least one of the process signal, the reference value, and the tolerance level.

25. The separate type photoelectric switch according to claim 23, wherein said processing means further comprises a power supply means for supplying said light receiving means with a power voltage for driving said light receiving means, the power voltage being a voltage representative of the relative value calculated by said calculating means, and said indicating means displays the tolerance level on the basis of the voltage supplied from said processing means.

26. The separate type photoelectric switch according to claim 24, wherein said processing means further comprises a first display for displaying the reference value comprising a plurality of digit numbers, and adjustable switching means for adjusting the reference value displayed on said first display.

27. The separate type photoelectric switch according to claim 21, wherein said processing means further comprises a power supply means which supplies said light receiving means with a power voltage for driving said light receiving means, the power voltage being a voltage representative of the information regarding the detection of the presence of the object, and said indicating means displays the information on the basis of the voltage supplied from said processing means.

28. The separate type photoelectric switch according to claim 21, wherein said light receiving means further comprises a light projecting means for projecting a light to said detection area.

29. The separate type photoelectric switch according to claim 21, wherein said indicating means displays the information in terms of a numerical value.

30. The separate type photoelectric switch according to claim 25, further comprising:
    a signal line through which said processing means receives the light reception signal output from said light receiving means; and
    a power line through which said power supply means provides the power voltage to said light receiving means.

31. A separate type photoelectric switch which detects an object in a detection area, said separate type photoelectric switch comprising:
    a head having a light projecting means for projecting a light to said detection area, and a light receiving means for receiving the light from said detection area and outputting a light reception signal based on the received light;
    a main body being formed separately from said head and having a processing means which detects the object in said detection area on the basis of the light reception signal; and
    a power supply means for supplying said head with a power voltage for driving said head, the power voltage being a voltage representative of information on an operation of said head; and
    wherein said head includes an operating means for performing a predetermined operation in accordance with the information represented by the voltage supplied from said main body.

32. The separate type photoelectric switch according to claim 31, wherein the information on the operation of said head includes information regarding the detection of the presence of said object executed by said processing means, and said operating means includes an indicating means for displaying the information on the basis of the voltage supplied from said main body.

33. The separate type photoelectric switch according to claim 32, wherein said indicating means displays the information in terms of a numerical value.

34. The separate type photoelectric switch according to claim 31, wherein the information on the operation of said head includes information on the gain of said light receiving means, and said operating means includes a gain select unit for changing the gain of said light receiving means on the basis of the voltage supplied from said main body.

35. The separate type photoelectric switch according to claim 31, wherein the information on the operation of said head includes information on the amount of light emitted by said light projecting means, and said operating means includes a light emitting amount select unit for changing the light emitting amount emitted by said light projecting means on the basis of the voltage supplied from said main body.

36. The separate type photoelectric switch according to claim 31, further comprising:
    a signal line through which said main body receives the light reception signal output from said light receiving means of said head; and
    a power line through which said power supply means provides the power voltage to said head.

37. A separate type photoelectric switch which detects an object in a detection area, said separate type photoelectric switch comprising:
    a head having a light receiver which receives a light from said detection area and outputs a light reception signal based on the received light; and
    a main body located separately from said head and having a processor which detects the object in said detection area on the basis of the light reception signal,
    wherein said head includes an indicator which displays information regarding the detection of the object executed by said processor and wherein said head is in signal communication with said main body.

38. The separate type photoelectric switch of claim 37, wherein said head is in signal communication with said main body through a cable.

39. The separate type photoelectric switch of claim 38, wherein said cable is a fiber optic cable.

* * * * *